US012651882B2

(12) United States Patent
Zhao et al.

(10) Patent No.: US 12,651,882 B2
(45) Date of Patent: Jun. 9, 2026

(54) QUANTUM CURRENT TRANSFORMER BASED ON BIDIRECTIONAL LIGHT COMPENSATION

(71) Applicant: ANHUI GUOSHENG QUANTUM TECHNOLOGY CO., LTD., Hefei High tech Zone (CN)

(72) Inventors: Bowen Zhao, Hefei High tech Zone (CN); Shaochun Zhang, Hefei High tech Zone (CN); Long Zhao, Hefei High tech Zone (CN); Rujia Qiu, Hefei High tech Zone (CN); Xin Wang, Hefei High tech Zone (CN); Yu Wang, Hefei High tech Zone (CN); Haitao Yang, Hefei High tech Zone (CN); Hui Liu, Hefei High tech Zone (CN); Jiaqi Geng, Hefei High tech Zone (CN)

(73) Assignee: ANHUI GUOSHENG QUANTUM TECHNOLOGY CO., LTD., Hefei High Tech Zone (CN)

( * ) Notice: Subject to any disclaimer, the term of this patent is extended or adjusted under 35 U.S.C. 154(b) by 543 days.

(21) Appl. No.: 18/235,543

(22) Filed: Aug. 18, 2023

(65) Prior Publication Data

US 2024/0356298 A1      Oct. 24, 2024

(30) Foreign Application Priority Data

Aug. 19, 2022    (CN) .......................... 202210996820.5

(51) Int. Cl.
*H01S 3/094*      (2006.01)
*B82Y 20/00*      (2011.01)
*G02B 6/42*      (2006.01)

(52) U.S. Cl.
CPC .. *H01S 3/094011* (2013.01); *H01S 3/094038* (2013.01); *H01S 3/094057* (2013.01); *B82Y 20/00* (2013.01); *G02B 6/4296* (2013.01)

(58) Field of Classification Search
CPC ............... H01S 3/094; H01S 3/094011; H01S 3/094038; H01S 3/094057; B82Y 20/00; G02B 6/42; G02B 6/4296; G02B 6/36; G02B 6/3624; G02B 27/09; G02B 27/0927; G02B 27/0955; G01R 15/24; G01R 15/245; G01R 19/00; G01R 19/0092
See application file for complete search history.

(56) References Cited

FOREIGN PATENT DOCUMENTS

| | | | | | |
|---|---|---|---|---|---|
| CN | 110174541 A | * | 8/2019 | ............. | G01R 15/18 |
| CN | 117074752 A | * | 11/2023 | ............. | G01R 15/20 |

* cited by examiner

*Primary Examiner* — Son T Le

(57) ABSTRACT

Provided is a quantum current transformer based on a bidirectional light compensation technology, including an annular cavity, a plurality of quantum probes, a front-end laser source, a back-end laser source, and a quantum processing system. The plurality of quantum probes are installed in the annular cavity and distributed in a circumference, the plurality of quantum probes are sequentially connected in series through an excitation optical fiber, and two quantum probes at both ends of a series light path are respectively connected to the front-end laser source and the back-end laser source outside the annular cavity through excitation optical fibers. The quantum processing system is connected to the plurality of quantum probes through a plurality of collection optical fibers.

20 Claims, 6 Drawing Sheets

QUANTUM CURRENT TRANSFORMER BASED ON BIDIRECTIONAL LIGHT COMPENSATION

CROSS REFERENCE TO RELATED APPLICATION

This patent application claims the benefit and priority of Chinese Patent Application No. 202210996820.5, filed with the China National Intellectual Property Administration on Aug. 19, 2022, the disclosure of which is incorporated by reference herein in its entirety as part of the present application.

TECHNICAL FIELD

The present disclosure relates to the technical field of current transformers, and in particular to a quantum current transformer based on a bidirectional light compensation technology.

BACKGROUND

Among many quantum systems, solid-state spin has been widely studied in recent years because of its ability to work at room temperature and high sensitivity. Meanwhile, the solid-state spin system has great potentials in robustness because of the structural stability of the physical carrier. Nitrogen vacancy color center (NV color center) is a point defect in diamond, which belongs to one of the solid-state spins and is also one of the most widely studied. Theoretically, the prediction sensitivity of the NV color center used in magnetic measurement can reach the order of femtosecond.

In recent years, the research of using the NV color center in diamond as a magnetic field measurement component to design the current sensor is increasing gradually. For example, a high-voltage current transformer based on quantum precision measurement is disclosed in invention patent No. CN201910265975. X, belonging to the technical field of precision measurement of current. In accordance with the scheme, multi-point measurement of the magnetic field around an electrified conductor is achieved through multiple diamond NV color center sensors, and then the current in the electrified conductor is calculated by processing multiple magnetic field information. However, such a measurement mode requires multiple excitation light path units to cooperate with each other, which makes the design cost of the current transformer higher and the light path design complex, which is not conducive to the miniaturization and integration of the whole device.

SUMMARY

Based on the technical problem in the background art, a quantum current transformer based on a bidirectional light compensation technology is provided.

A quantum current transformer based on bidirectional light compensation technology provided by the present disclosure includes an annular cavity, multiple quantum probes, a front-end laser source, a back-end laser source, and a quantum processing system.

The multiple quantum probes are installed in the annular cavity and distributed in a circumference, the multiple quantum probes are sequentially connected in series through an excitation optical fiber, and two quantum probes at both ends of a series light path are respectively connected to the front-end laser source and the back-end laser source outside the annular cavity through excitation optical fibers.

The quantum processing system is respectively connected to the multiple quantum probes through multiple collection optical fibers.

Preferably, the front-end laser source and the back-end laser source have the same light intensity.

Preferably, the quantum current transformer further includes a housing. The housing is of a circular structure and provides the annular cavity, the circumference where the multiple quantum probes are located is concentric with the housing, and an inner wall of the shell is provided with a high-temperature resistant dehumidifying layer. The annular cavity is provided with a magnetic shielding ring, and multiple quantum probes are all located in the magnetic shielding ring.

Preferably, each quantum probe includes a mounting rack, a rotating parabolic concentrating cover, a light collector, and a diamond particle containing an ensemble NV color center. The mounting rack is mounted on the inner wall of the housing, the rotating parabolic concentrating cover and the light collector are mounted on the mounting rack, and the light collector is located at a light outlet side of the rotating parabolic concentrating cover. One side, away from the rotating parabolic concentrating cover, of the light collector is provided with a collection light path interface connected to the collection optical fiber. Excitation light path interfaces connected to the excitation optical fiber are arranged on the mounting rack at both sides of the rotating parabolic concentrating cover, the excitation light path interfaces hermetically penetrate through the rotating parabolic concentrating cover and extend into the rotating parabolic concentrating cover. The diamond particle is arranged at a focus of the rotating parabolic concentrating cover and mounted on the rotating parabolic concentrating cover through a supporting member.

Preferably, a glass dust cover is arranged at a light outlet of the rotating parabolic concentrating cover.

Preferably, each excitation light path interface includes a circular tube hermetically penetrating through the rotating parabolic concentrating cover and extending into the rotating parabolic concentrating cover. A first lens is mounted at one end, close to the diamond particle, of the circular tube, and a focus of the first lens coincides with that of the rotating parabolic concentrating cover. An optical fiber connector connected to the excitation optical fiber is arranged at one end, away from the diamond particle, of the circular tube.

Preferably, the light collector includes a cylinder mounted on the mounting rack. One end, close to the rotating parabolic concentrating cover, of the cylinder is provided with an opening, and one end, away from the rotating parabolic concentrating cover, of the cylinder is provided with the collecting light path interface. A second lens and a third lens are arranged in the cylinder, and the second lens and the third lens form a conjugate lens group for performing beam reduction on fluorescence reflected by the rotating parabolic concentrating cover.

Preferably, the supporting member includes a mounting rod. The mounting rod penetrates through a bottom end of the rotating parabolic concentrating cover and is rotationally connected to the rotating parabolic concentrating cover. The diamond particle is mounted at one end, located in the rotating parabolic concentrating cover, of the mounting rod, and a self-locking rotary adjusting member is connected to one end, out of the rotating parabolic concentrating cover, of the mounting rod. The self-locking rotary adjusting member includes a sleeve, a worm gear, and a worm. The sleeve is fixed to the bottom of the rotating parabolic concentrating cover and covers the mounting rod, the worm gear is arranged in the sleeve and is fixed to the mounting rod. The worm is rotationally arranged in the sleeve and meshed with the worm gear, and a rotating wheel connected to the worm is rotatably arranged on the sleeve.

Preferably, a light filter for filtering the reflected fluorescence in the excitation optical fiber is arranged on the excitation optical fiber between any two adjacent quantum probes. Preferably, the light filter includes a cage-type lens holder mounted on the inner wall of the annular cavity, both sides of the cage-type lens holder are connected to the excitation optical fibers through optical fiber couplers, a dichroic mirror capable of allowing trigger green light to pass through is obliquely arranged at the position between the two optical fiber couplers in the cage-type lens holder. On the cage-type lens holder, light absorbing sheets are arranged on both sides of the dichroic mirror and used for absorbing reflected light of the dichroic mirror.

Preferably, the diamond particle is surrounded by a microwave generating copper wire, and two microwave wire connectors are fixed to the rotating parabolic concentrating cover. Both ends of the microwave generating copper wire are respectively connected to the two microwave wire connectors, and the quantum processing system is connected to the two microwave wire connectors through microwave antennas.

Based on the technical problem in the background art, a quantum current transformer based on a bidirectional light compensation technology has the beneficial effects that:

1. In accordance with the present disclosure, multiple quantum probes are connected in series through an excitation optical fiber, and the excitation of the multiple quantum probes can be achieved through a front-end laser source and a back-end laser source, and thus a device structure is simplified, and the production cost is reduced. Moreover, as the design of the front-end laser source and the back-end laser source can achieve the light intensity compensation, the light intensity in contact with multiple NV color centers in diamond is consistent, and then the accuracy of a detection result is ensured.

2. In accordance with the present disclosure, the designed rotating parabolic concentrating cover can efficiently collect the reflected fluorescence generated by the NV color center in diamond. The designed conjugate lens group is used to perform beam reduction on the reflected fluorescence, such that the reflected fluorescence can be focused into the collecting optical fiber, thereby achieve the function of improving the efficient collection of fluorescence.

3. By designing two groups of focused first lenses, the excitation light can be focused on the diamond particle position, and thus the excitation efficiency of the fluorescence is improved.

4

Figure 6:
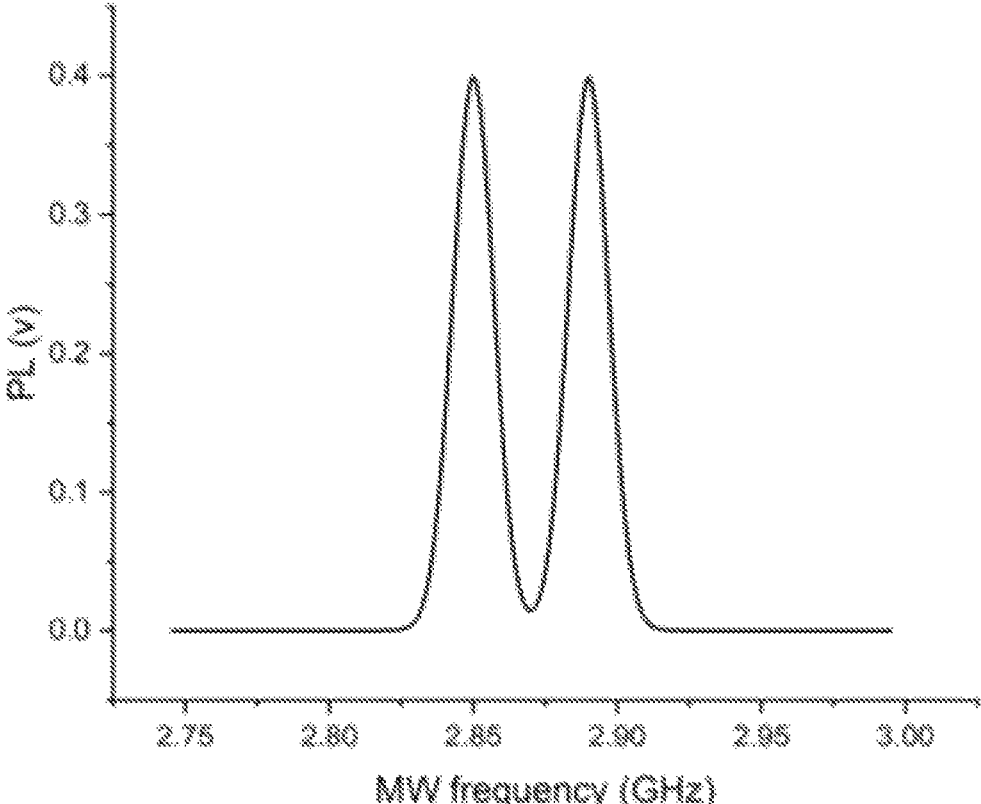

FIG. 6 is a detection result diagram of an ODMR (Optically Detected Magnetic Resonance) method according to an embodiment of the present disclosure.

DETAILED DESCRIPTION OF THE EMBODIMENTS

To make the above objectives, features and advantages of the present disclosure more apparently and understandably, the specific embodiments of the present disclosure are described in detail below with reference to the accompanying drawings. Apparently, the described embodiment is a part rather than all of the embodiments of the present disclosure. All other embodiments obtained by those of ordinary skill in the art based on the embodiments of the present disclosure without creative efforts shall fall within the protection scope of the present disclosure.

Embodiment I

With reference to FIG. 1 to FIG. 4, a quantum current transformer based on a bidirectional light compensation technology provided by the present disclosure includes a housing 8, multiple quantum probes 2, a front-end laser source 3, a back-end laser source 4, and a quantum processing system 5.

The housing 8 is of a circular ring structure and provides an annular cavity 1. An inner side of the housing 8 needs to be designed to prevent dust and moisture, and preferably, a high-temperature resistant dehumidifying layer can be arranged on an inner wall of the housing 8.

The multiple quantum probes 2 are mounted in the annular cavity 1 and are uniformly distributed in a circumference, and the circumference where the multiple quantum probes 2 are located is concentric with the housing 8. The number of quantum probes 2 is not less than four, and the number is even. The multiple quantum probes 2 are sequentially connected in series through an excitation optical fiber, and two quantum probes 2 at both ends of a series light path are respectively connected to the front-end laser source 3 and the back-end laser source 4 outside the annular cavity 1 through excitation optical fibers 6.

The quantum processing system 5 is connected to the multiple quantum probes 2 through multiple collection optical fibers 7, respectively. The quantum processing system 5 is used for receiving and processing the collected reflection data, so as to obtain the magnitude of a current in a measured electrified conductor a.

Considering that the intensity of trigger light gradually decreases after passing through the NV color centers of adjacent diamond, in this embodiment, one end of the excitation optical fiber 6 is connected to the front-end laser source 3, the other end of the excitation optical fiber 6 is connected to the back-end laser source 4, and all the quantum probes 2 are connected in series on the excitation optical fiber 6 in turn. During operation, two trigger lasers enter from both ends of the excitation optical fiber 6 at the same time, the intensity of the trigger light can be compensated after superposition processing of the two trigger lasers, such that the intensity of the trigger light received by each quantum probe 2 at a diamond sample is almost the same, and the consistency of detection of each probe is ensured. Therefore, the system calibration difficulty is reduced, and the measurement accuracy is further improved. Preferably, the front-end laser source 3 and the back-end laser source 4 are 532 nm laser sources with the same light intensity, which is more conducive to ensuring the same light intensity at each diamond sample.

Figure 1:
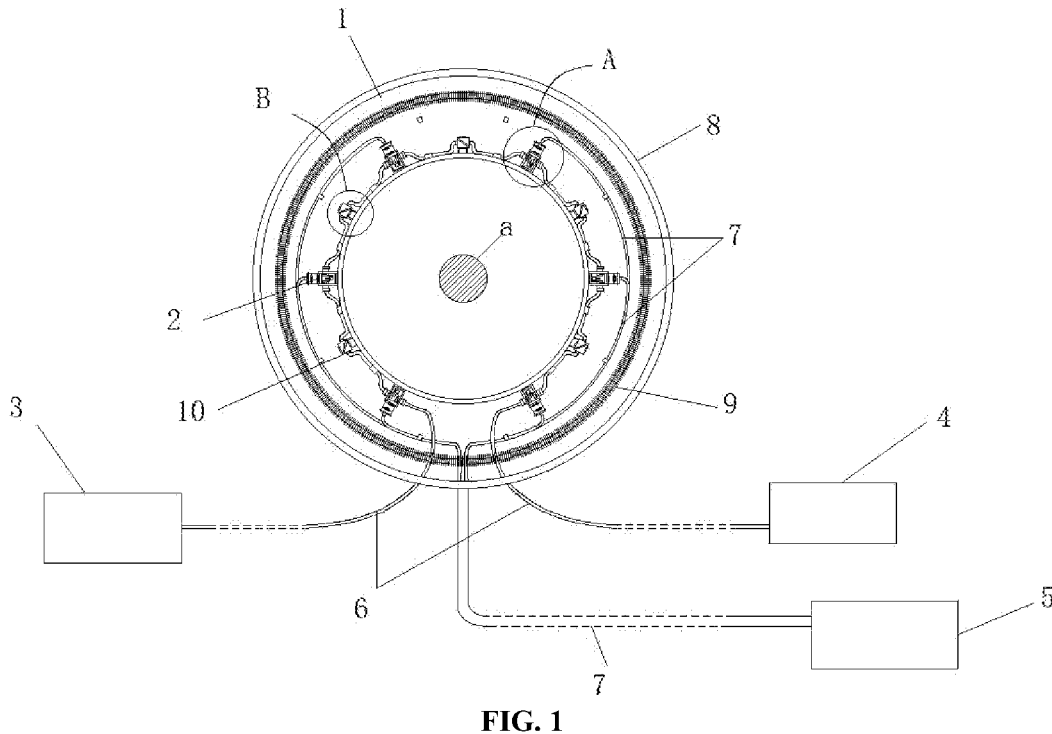
FIG. 1 is a structural schematic diagram of a quantum current transformer based on a bidirectional light compensation technology according to the present disclosure.

In this embodiment, further, in order to improve the detection accuracy, it is necessary to shield the interference of the magnetic field environment. As shown in FIG. 1, the annular cavity 1 is provided with a magnetic shielding ring 9, and the multiple quantum probes 2 are located in the magnetic shielding ring 9.

Figure 2:
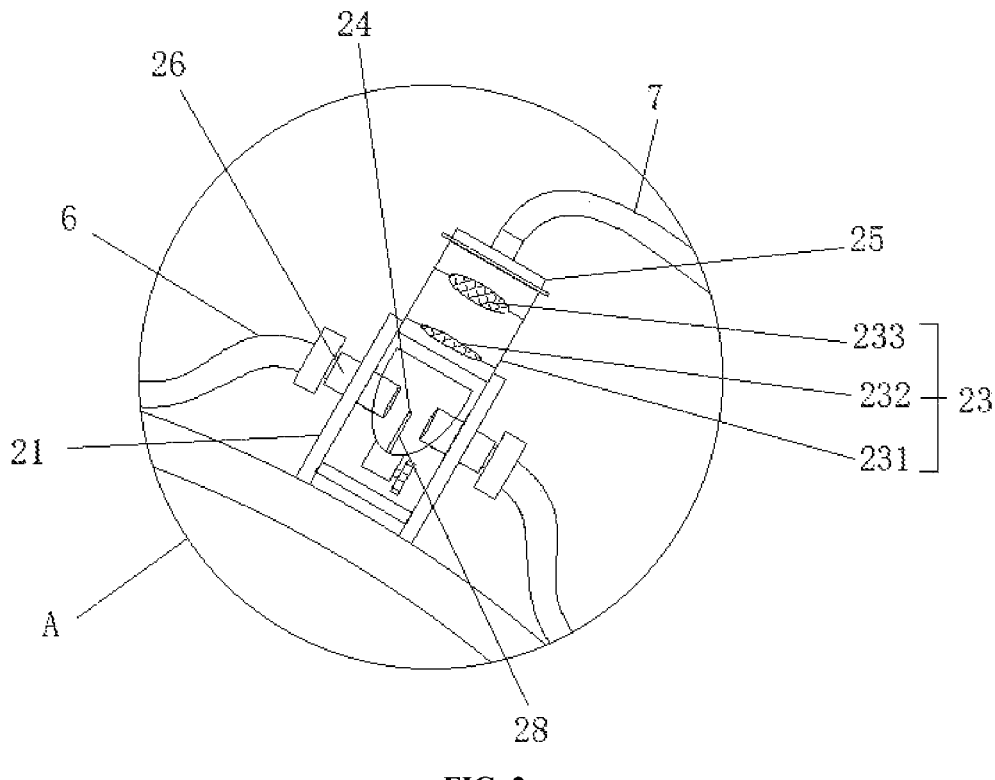
FIG. 2 is an enlarged view of A in FIG. 1.
Figure 4:
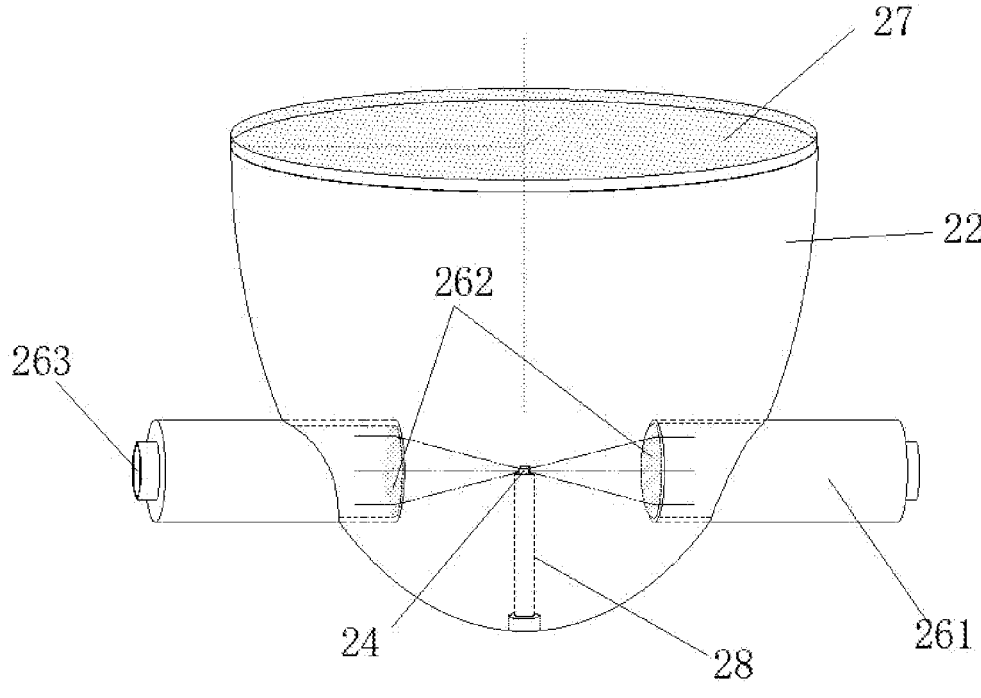
FIG. 4 is a structural schematic diagram of a quantum probe in a quantum current transformer based on a bidirectional light compensation technology.

In this embodiment, as shown in FIG. 2 and FIG. 4, each quantum probe 2 includes mounting rack 21, a rotating parabolic concentrating cover 22, a light collector 23, and a diamond particle 24 containing an ensemble NV color center. The mounting rack 21 is mounted on the inner wall of the housing 8, the rotating parabolic concentrating cover 22 and the light collector 23 are mounted on the mounting rack 21, and the light collector 23 is located at a light outlet side of the rotating parabolic concentrating cover 22. One side, away from the rotating parabolic concentrating cover 22, of the light collector 23 is provided with a collection light path interface 25 connected to the collection optical fiber 7. Excitation light path interfaces 26 connected to the excitation optical fiber 6 are arranged on the mounting rack 21 at both sides of the rotating parabolic concentrating cover 22. The excitation light path interfaces 26 hermetically penetrate through the rotating parabolic concentrating cover 22 and extend into the rotating parabolic concentrating cover 22. The diamond particle 24 is arranged at a focus of the rotating parabolic concentrating cover 22 and mounted on the rotating parabolic concentrating cover 22 through a supporting member 28. The rotating parabolic concentrating cover 22 can efficiently collect the reflected fluorescence generated by the NV color center in the diamond.

The supporting member 28 is a thin rod fixed in the rotating paraboloid concentrating cover 22, and a top end of the thin rod is located at a focus of the rotating paraboloid concentrating cover 22. During machining, the diamond particle 24 can be fixed to the top end of the thin rod by bonding or the like.

Further, as shown in FIG. 4, a glass dust cover 27 is arranged at a light outlet of the rotating parabolic concentrating cover 22, which can prevent dust from entering the rotating parabolic concentrating cover 22 and ensure the cleanliness of the NV color center itself and the surrounding environment.

Further, as shown in FIG. 4, each excitation light path interface 26 includes a circular tube 261 hermetically penetrating through the rotating parabolic concentrating cover 22 and extending into the rotating parabolic concentrating cover 22. A first lens 262 is mounted at one end, close to the diamond particle 24, of the circular tube 261, and a focus of the first lens 262 coincides with that of the rotating parabolic concentrating cover 22, and an optical fiber connector 263 connected to the excitation optical fiber 6 is arranged at one end, away from the diamond particle 24, of the circular tube 261. By arranging the first lenses 252 on both sides of the diamond particle 24, the trigger lasers transmitted from both sides can be concentrated to irradiate on the diamond particle 24, such that the light intensity irradiating on the diamond particle 24 is higher and the NV color center is enabled to emit more fluorescence, thereby effectively improving the detection accuracy. Moreover, the remaining green light can be coupled to the next optical fiber, so as to excite another diamond sample.

Specifically, as shown in FIG. 4, the light collector 23 includes a cylinder 231 mounted on the mounting rack 21. One end, close to the rotating parabolic concentrating cover

22, of the cylinder 231 is provided with an opening, and one end, away from the rotating parabolic concentrating cover 22, of the cylinder 231 is provided with the collection light path interface 25. A second lens 232 and a third lens 233 are arranged in the cylinder 231, and the second lens 232 and the third lens 233 form a conjugate lens group for performing beam reduction on the fluorescence reflected by the rotating parabolic concentrating cover 22. During use, the conjugate lens group is used to perform beam reduction on the fluorescence reflected by the rotating parabolic concentrating cover 22, such that the reflected fluorescence can enter the collection optical fiber 7 for transmission after beam reduction, and the function of improving the efficient collection of fluorescence is achieved.

Further, considering that the reflected red fluorescence generated by the NV color center enters the adjacent NV color center with the excitation optical fiber 6, in order to avoid the mutual interference of reflected light between adjacent NV color centers, as shown in FIG. 1, a light filter 10 for filtering the reflected fluorescence in the excitation optical fiber 6 is arranged on the excitation optical fiber 6 between any two adjacent quantum probes 2.

Figure 3:
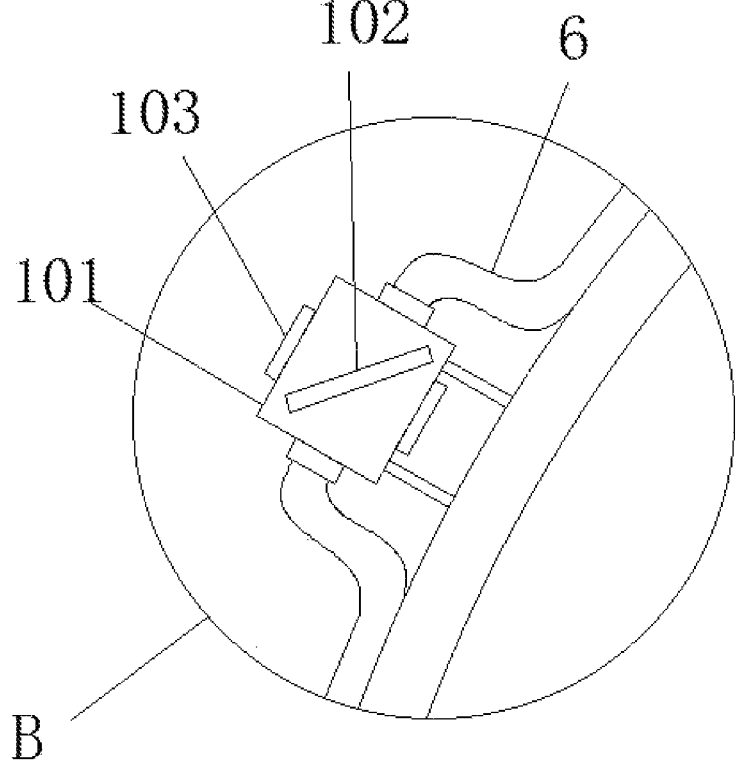
FIG. 3 is an enlarged view of B in FIG. 1.

Preferably, as shown in FIG. 3, the light filter 10 includes a cage-type lens holder 101 installed on the inner wall of the annular cavity 1, both sides of the cage-type lens holder 101 are connected to the excitation optical fibers 6 through optical fiber couplers. In the cage-type lens holder 101, a dichroic mirror 102 through which the trigger green light can pass but the reflected red light cannot is obliquely arranged at the position between the two optical fiber couplers. On the cage-type lens holder 101, light absorbing sheets 103 are arranged on both sides of the dichroic mirror 102 and used for absorbing reflected light of the dichroic mirror 102. During specific operation, the trigger green light is directly transmitted through the dichroic mirror 102, while a small amount of reflected red light is reflected by the dichroic plate 102 to the light absorbing sheets 103 at the upper and lower sides for blocking absorption, thus efficiently isolating the mutual interference of reflected light between the adjacent NV color centers. It should be noted that this structure is only one of the light filter structures, and in fact, the structure designs of filtering the reflected fluorescence passing through the excitation optical fiber 6 by using the dichroic mirror, a filter, etc. are included in a light filter structure referred to in the present disclosure.

The principle of this embodiment is as follows:

An electrified straight conductor a may generate an annular magnetic field around itself. According to the Biot-Savart law, it can be known that the magnitude of the magnetic field is linear with a load current, so the magnitude of the load current can be calculated by measuring the magnitude of the magnetic field around the conductor a.

When there is a magnetic field at the periphery of the NV color center, and if a direction of the magnetic field is not parallel to an axial direction of the NV color center, an external magnetic field may change an eigenstate of an energy level of the NV color center, in turn change a transition rate between energy levels, and finally change the layout of electrons at different energy levels. According to the dependence of the fluorescence emission intensity and the energy level state, it can be concluded that the intensity of fluorescence reflected by the NV color center is related to the magnitude and direction of the external magnetic field. If an included angle between the external magnetic field and the axial direction of the NV color center remains unchanged, the intensity of the fluorescence reflected by the NV color center may change regularly with the change of the intensity of the magnetic field. Based on the steady-state energy level transition equation, the relationship between the external magnetic field and the NV color center can be obtained. At the moment, the magnitude of the external magnetic field can be estimated by measuring the fluorescence intensity, and then the magnitude of the current in the electrified conductor a can be calculated. Such a method is an all-optical method to detect the magnetic field, and no microwave is used.

Embodiment II

Figure 5:
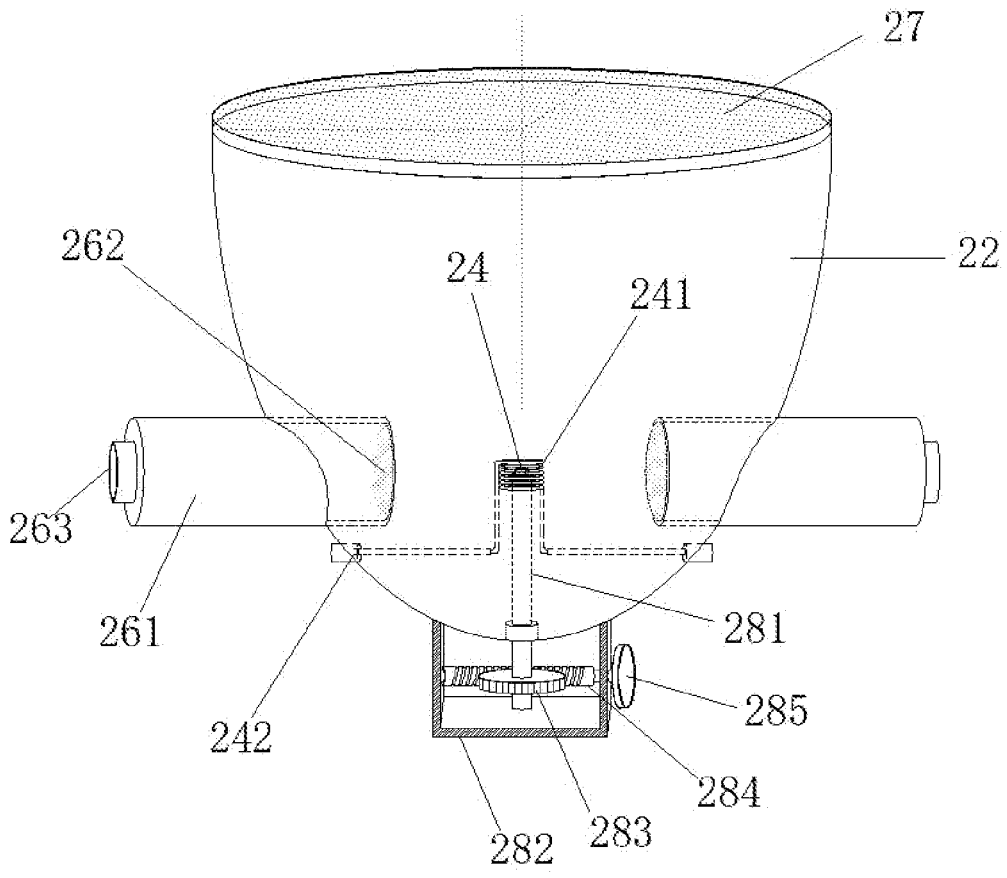
FIG. 5 is another structural schematic diagram of a quantum probe in a quantum current transformer based on a bidirectional light compensation technology.

A quantum current transformer based on a bidirectional light compensation technology is provided, the difference of which form Embodiment I is that as shown in FIG. 5, the diamond particle 24 is surrounded by a microwave generating copper wire 241, and two microwave wire connectors 242 are fixed to the rotating parabolic concentrating cover 22. Both ends of the microwave generating copper wire 241 are respectively connected to the two microwave wire connectors 242. The quantum processing system 5 includes a microwave excitation unit, the microwave excitation unit is connected to the two microwave wire connectors 242 through microwave antennas, so as to sequentially connect all microwave generating copper wires 214 in series.

Based on such probes, an ODMR detection method is used, and its specific detection principle is as follows:

When in the environment without the magnetic field, under the scanning of continuous microwave signals, the ground-state electrons of the NV color center first transition from $M_s=0$ to $M_s=\pm1$ in the ground state. Due to the environment without the magnetic field, $M_s=\pm1$ is a degenerate doublet at this time, which may transition when the frequency is 2.87 GHZ, and the continuous spectrum will produce a peak only at this point of 2.87 GHz. When in an environment with the magnetic field, due to the action of magnetic field, the two states of degenerate doublet will be separated, and an energy difference between the two states is $2\gamma B$, which is symmetrically distributed with the 2.87 GHz as the center. Therefore, under the action of continuous spectrum, two peaks may appear, and these two peaks are symmetrically distributed relative to 2.87 GHz. Therefore, only the distance between the two peaks needs to be known when measuring. Because $\gamma$ is a known quantity, the magnitude of the magnetic field B can be obtained.

Embodiment III

In fact, because the NV color center in the diamond has four axial directions, there are often multiple peaks when measured by the ODMR method, which complicates the process of current measurement. In order to simplify the measurement process, the diamond particle 24 may be particularly modulated when arranged, such that a certain crystal direction of the NV color center in diamond is parallel to the magnetic field around the electrified conductor. At the moment, because the included angles between the magnetic field direction and the four axial directions are consistent, only two peaks will be produced in the spectrum detected by ODMR method, as shown in FIG. 6, which makes the subsequent measurement and calculation process easier.

In order to achieve the above objective, another supporting member 28 for the diamond particle 24 is designed in this embodiment. Referring to FIG. 4, the supporting member 28 includes a mounting rod 281. The mounting rod 281 penetrates through a bottom end of the rotating parabolic concentrating cover 22 and is rotatably connected to the rotating parabolic concentrating cover 22. The diamond particle 24 is mounted at one end, located in the rotating parabolic concentrating cover 22, of the mounting rod 281, and a self-locking rotary adjusting member is connected to one end, out of the rotating parabolic concentrating cover 22, of the mounting rod 281. The supporting member 28 can achieve the rotation adjustment of the diamond particle 24. Compared with the fixed thin rod design in Embodiment I, it is more operable and can meet various detection requirements.

Further, with reference to FIG. 5, the self-locking rotary adjusting member includes a sleeve 282, a worm gear, 283 and a worm 284. The sleeve 282 is fixed to a bottom of the rotating parabolic concentrating cover 22 and covers the mounting rod 281. The worm gear 283 is arranged in the sleeve 282 and is fixed to the mounting rod 281, the worm 284 is rotationally arranged in the sleeve 282 and meshed with the worm gear 283, and a rotating wheel 285 connected to the worm 284 is rotatably arranged on the sleeve 282. During use, because the worm gear 283 and the worm 284 are fitted with each other to provide self-locking characteristics, after the angle of the diamond particle 24 is adjusted, i.e., the position state remains fixed, and the stability after angle adjustment is ensured.

The above mentioned is only a preferred specific embodiment of the present disclosure, but the scope of protection of the present disclosure is not limited thereto, the equivalent replacement or changes made by any person skilled in the art according to the technical solution of the present disclosure and its inventive idea within the technical scope disclosed by the present disclosure shall be included in the scope of protection of the present disclosure.

What is claimed is:

1. A quantum current transformer based on a bidirectional light compensation technology, comprising an annular cavity, a plurality of quantum probes, a front-end laser source, a back-end laser source, and a quantum processing system;

the plurality of quantum probes are installed in the annular cavity and distributed in a circumference, the plurality of quantum probes are sequentially connected in series through an excitation optical fiber, and two quantum probes at both ends of a series light path are respectively connected to the front-end laser source and the back-end laser source outside the annular cavity through excitation optical fibers;

the quantum processing system is respectively connected to the plurality of quantum probes through a plurality of collection optical fibers.

2. The quantum current transformer based on a bidirectional light compensation technology according to claim 1, wherein the front-end laser source and the back-end laser source have the same light intensity.

3. The quantum current transformer based on a bidirectional light compensation technology according to claim 1, further comprising a housing, wherein the housing is of a circular structure and provides the annular cavity, the circumference where the plurality of quantum probes are located is concentric with the housing, and an inner wall of the shell is provided with a high-temperature resistant dehumidifying layer; the annular cavity is provided with a magnetic shielding ring, and the plurality of quantum probes are all located in the magnetic shielding ring.

4. The quantum current transformer based on a bidirectional light compensation technology according to claim 1, wherein each quantum probe comprises a mounting rack, a rotating parabolic concentrating cover, a light collector, and a diamond particle containing an ensemble NV color center, the mounting rack is mounted on the inner wall of the housing, the rotating parabolic concentrating cover and the light collector are mounted on the mounting rack, and the light collector is located at a light outlet side of the rotating parabolic concentrating cover; one side, away from the rotating parabolic concentrating cover, of the light collector is provided with a collection light path interface connected to the collection optical fiber; excitation light path interfaces connected to the excitation optical fiber are arranged on the mounting rack at both sides of the rotating parabolic concentrating cover, the excitation light path interfaces hermetically penetrate through the rotating parabolic concentrating cover and extend into the rotating parabolic concentrating cover, and the diamond particle is arranged at a focus of the rotating parabolic concentrating cover and mounted on the rotating parabolic concentrating cover through a supporting member.

5. The quantum current transformer based on a bidirectional light compensation technology according to claim 4, wherein a glass dust cover is arranged at a light outlet of the rotating parabolic concentrating cover.

6. The quantum current transformer based on a bidirectional light compensation technology according to claim 4, wherein each excitation light path interface comprises a circular tube hermetically penetrating through the rotating parabolic concentrating cover and extending into the rotating parabolic concentrating cover, a first lens is mounted at one end, close to the diamond particle, of the circular tube, and a focus of the first lens coincides with that of the rotating parabolic concentrating cover, and an optical fiber connector connected to the excitation optical fiber is arranged at one end, away from the diamond particle, of the circular tube.

7. The quantum current transformer based on a bidirectional light compensation technology according to claim 4, wherein the light collector comprises a cylinder mounted on the mounting rack, one end, close to the rotating parabolic concentrating cover, of the cylinder is provided with an opening, and one end, away from the rotating parabolic concentrating cover, of the cylinder is provided with the collecting light path interface; a second lens and a third lens are arranged in the cylinder, and the second lens and the third lens form a conjugate lens group for performing beam reduction on fluorescence reflected by the rotating parabolic concentrating cover.

8. The quantum current transformer based on a bidirectional light compensation technology according to claim 4, wherein the supporting member comprises a mounting rod, the mounting rod penetrates through a bottom end of the rotating parabolic concentrating cover and is rotationally connected to the rotating parabolic concentrating cover, the diamond particle is mounted at one end, located in the rotating parabolic concentrating cover, of the mounting rod, and a self-locking rotary adjusting member is connected to one end, out of the rotating parabolic concentrating cover, of the mounting rod; the self-locking rotary adjusting member comprises a sleeve, a worm gear and a worm, wherein the sleeve is fixed to the bottom of the rotating parabolic concentrating cover and covers the mounting rod, the worm gear is arranged in the sleeve and is fixed to the mounting rod, the worm is rotationally arranged in the sleeve and meshed with the worm gear, and a rotating wheel connected to the worm is rotatably arranged on the sleeve.

9. The quantum current transformer based on a bidirectional light compensation technology according to claim 4, wherein a light filter for filtering the reflected fluorescence in the excitation optical fiber is arranged on the excitation optical fiber between any two adjacent quantum probes.

10. The quantum current transformer based on a bidirectional light compensation technology according to claim 4, wherein the diamond particle is surrounded by a microwave generating copper wire, and two microwave wire connectors are fixed to the rotating parabolic concentrating cover, and both ends of the microwave generating copper wire are respectively connected to the two microwave wire connectors, and the quantum processing system is connected to the two microwave wire connectors through microwave antennas.

11. The quantum current transformer based on a bidirectional light compensation technology according to claim 2, wherein each quantum probe comprises a mounting rack, a rotating parabolic concentrating cover, a light collector, and a diamond particle containing an ensemble NV color center, the mounting rack is mounted on the inner wall of the housing, the rotating parabolic concentrating cover and the light collector are mounted on the mounting rack, and the light collector is located at a light outlet side of the rotating parabolic concentrating cover; one side, away from the rotating parabolic concentrating cover, of the light collector is provided with a collection light path interface connected to the collection optical fiber; excitation light path interfaces connected to the excitation optical fiber are arranged on the mounting rack at both sides of the rotating parabolic concentrating cover, the excitation light path interfaces hermetically penetrate through the rotating parabolic concentrating cover and extend into the rotating parabolic concentrating cover, and the diamond particle is arranged at a focus of the rotating parabolic concentrating cover and mounted on the rotating parabolic concentrating cover through a supporting member.

12. The quantum current transformer based on a bidirectional light compensation technology according to claim 3, wherein each quantum probe comprises a mounting rack, a rotating parabolic concentrating cover, a light collector, and a diamond particle containing an ensemble NV color center, the mounting rack is mounted on the inner wall of the housing, the rotating parabolic concentrating cover and the light collector are mounted on the mounting rack, and the light collector is located at a light outlet side of the rotating parabolic concentrating cover; one side, away from the rotating parabolic concentrating cover, of the light collector is provided with a collection light path interface connected to the collection optical fiber; excitation light path interfaces connected to the excitation optical fiber are arranged on the mounting rack at both sides of the rotating parabolic concentrating cover, the excitation light path interfaces hermetically penetrate through the rotating parabolic concentrating cover and extend into the rotating parabolic concentrating cover, and the diamond particle is arranged at a focus of the rotating parabolic concentrating cover and mounted on the rotating parabolic concentrating cover through a supporting member.

13. The quantum current transformer based on a bidirectional light compensation technology according to claim 11, wherein a glass dust cover is arranged at a light outlet of the rotating parabolic concentrating cover.

14. The quantum current transformer based on a bidirectional light compensation technology according to claim 12, wherein a glass dust cover is arranged at a light outlet of the rotating parabolic concentrating cover.

15. The quantum current transformer based on a bidirectional light compensation technology according to claim 11, wherein each excitation light path interface comprises a circular tube hermetically penetrating through the rotating parabolic concentrating cover and extending into the rotating parabolic concentrating cover, a first lens is mounted at one end, close to the diamond particle, of the circular tube, and a focus of the first lens coincides with that of the rotating parabolic concentrating cover, and an optical fiber connector connected to the excitation optical fiber is arranged at one end, away from the diamond particle, of the circular tube.

16. The quantum current transformer based on a bidirectional light compensation technology according to claim 12, wherein each excitation light path interface comprises a circular tube hermetically penetrating through the rotating parabolic concentrating cover and extending into the rotating parabolic concentrating cover, a first lens is mounted at one end, close to the diamond particle, of the circular tube, and a focus of the first lens coincides with that of the rotating parabolic concentrating cover, and an optical fiber connector connected to the excitation optical fiber is arranged at one end, away from the diamond particle, of the circular tube.

17. The quantum current transformer based on a bidirectional light compensation technology according to claim 11, wherein the light collector comprises a cylinder mounted on the mounting rack, one end, close to the rotating parabolic concentrating cover, of the cylinder is provided with an opening, and one end, away from the rotating parabolic concentrating cover, of the cylinder is provided with the collecting light path interface; a second lens and a third lens are arranged in the cylinder, and the second lens and the third lens form a conjugate lens group for performing beam reduction on fluorescence reflected by the rotating parabolic concentrating cover.

18. The quantum current transformer based on a bidirectional light compensation technology according to claim 12, wherein the light collector comprises a cylinder mounted on the mounting rack, one end, close to the rotating parabolic concentrating cover, of the cylinder is provided with an opening, and one end, away from the rotating parabolic concentrating cover, of the cylinder is provided with the collecting light path interface; a second lens and a third lens are arranged in the cylinder, and the second lens and the third lens form a conjugate lens group for performing beam reduction on fluorescence reflected by the rotating parabolic concentrating cover.

19. The quantum current transformer based on a bidirectional light compensation technology according to claim 11, wherein the supporting member comprises a mounting rod, the mounting rod penetrates through a bottom end of the rotating parabolic concentrating cover and is rotationally connected to the rotating parabolic concentrating cover, the diamond particle is mounted at one end, located in the rotating parabolic concentrating cover, of the mounting rod, and a self-locking rotary adjusting member is connected to one end, out of the rotating parabolic concentrating cover, of the mounting rod; the self-locking rotary adjusting member comprises a sleeve, a worm gear and a worm, wherein the sleeve is fixed to the bottom of the rotating parabolic concentrating cover and covers the mounting rod, the worm gear is arranged in the sleeve and is fixed to the mounting rod, the worm is rotationally arranged in the sleeve and meshed with the worm gear, and a rotating wheel connected to the worm is rotatably arranged on the sleeve.

20. The quantum current transformer based on a bidirectional light compensation technology according to claim 12, wherein the supporting member comprises a mounting rod, the mounting rod penetrates through a bottom end of the rotating parabolic concentrating cover and is rotationally connected to the rotating parabolic concentrating cover, the diamond particle is mounted at one end, located in the rotating parabolic concentrating cover, of the mounting rod, and a self-locking rotary adjusting member is connected to one end, out of the rotating parabolic concentrating cover, of the mounting rod; the self-locking rotary adjusting member comprises a sleeve, a worm gear and a worm, wherein the sleeve is fixed to the bottom of the rotating parabolic concentrating cover and covers the mounting rod, the worm gear is arranged in the sleeve and is fixed to the mounting rod, the worm is rotationally arranged in the sleeve and meshed with the worm gear, and a rotating wheel connected to the worm is rotatably arranged on the sleeve.

* * * * *